United States Patent [19]
Fukuoka et al.

[11] Patent Number: 5,960,229
[45] Date of Patent: Sep. 28, 1999

[54] IMAGE PROCESSING METHOD AND APPARATUS

[75] Inventors: Shigeo Fukuoka, Machida; Masahiro Funada; Yukari Toda, both of Yokohama, all of Japan

[73] Assignee: Canon Kabushiki Kaisha, Tokyo, Japan

[21] Appl. No.: 08/989,688

[22] Filed: Dec. 12, 1997

[30] Foreign Application Priority Data

Dec. 26, 1996 [JP] Japan .................................. 8-348437

[51] Int. Cl.$^6$ .................................................. G03G 15/00
[52] U.S. Cl. ........................ 399/17; 399/81; 399/371; 358/488
[58] Field of Search .................... 399/16, 17, 38, 399/45, 81, 361, 364, 365, 370, 371, 376, 410; 358/488, 462; 382/168, 181, 224, 229

[56] References Cited

U.S. PATENT DOCUMENTS

| | | |
|---|---|---|
| 5,220,395 | 6/1993 | Yamashita et al. .................. 399/81 X |
| 5,229,812 | 7/1993 | Toyama et al. ..................... 399/410 X |
| 5,251,023 | 10/1993 | Arimoto et al. ....................... 358/529 |
| 5,287,159 | 2/1994 | Sakakibara .......................... 399/376 X |
| 5,508,798 | 4/1996 | Yamada .................................. 399/410 |
| 5,508,810 | 4/1996 | Sato ................................... 358/488 X |
| 5,600,429 | 2/1997 | Kutsuwada ............................... 399/17 |
| 5,696,841 | 12/1997 | Nakatsuka .......................... 358/462 X |
| 5,727,082 | 3/1998 | Sugishima .............................. 382/229 |

Primary Examiner—Sandra Brase
Attorney, Agent, or Firm—Fitzpatrick, Cella, Harper & Scinto

[57] ABSTRACT

The type of a document placed on the platen of an image forming apparatus is designated by the operator, a character area in the document is discriminated based upon an image signal obtained by reading the document, the orientation of the document is sensed based upon the discriminated character area and the type of document designated, and the image signal is processed based upon the sensed orientation of the document so as to obtain correctly oriented text at output of a prescribed image, such as a double-sided print image or layout of images of reduced size.

24 Claims, 12 Drawing Sheets

| 1 | . | 本 | 発 | 明 | の | 名 | 称 |

FIG. 8

| 0° | 90° | 180° | 270° |
|---|---|---|---|
| 本 | 本 | 本 | 本 |
| 本 | 町 | 克 | 武 |
| 0.90 | 0.40 | 0.30 | 0.50 |

CHARACTER RECOGNIZED
MATCHING PROBABILITY

FIG. 9

701: LINE RECTANGLE

702: IN CASE OF JAPANESE LANGUAGE

FIG. 10

801: LINE RECTANGLE

802: IN CASE OF ENGLISH LANGUAGE

CROSSWISE BINDING

BINDING AT TOP MARGIN

BINDING AT BOTTOM MARGIN

FIG. 14

LENGTHWISE BINDING

BINDING AT LEFT MARGIN

BINDING AT RIGHT MARGIN

IMAGE PROCESSING METHOD AND APPARATUS

BACKGROUND OF THE INVENTION

This invention relates to an image processing apparatus and method which make it possible to produce a double-sided print output and a reduced-scale layout output, to adjust binding margin position and to enable stapling of documents.

An image forming apparatus such as a copier or printer according to the prior art has a double-sided print output function, a reduced-scale layout output function and a stapling function. These functions are selected by user operation but can be used only when the output paper has a predetermined orientation.

Since the functions mentioned above can be implemented by the conventional apparatus only if the output paper has a predetermined orientation, as mentioned above, difficulties of the kind shown in FIGS. 11A–11H arise.

Figure 11A:
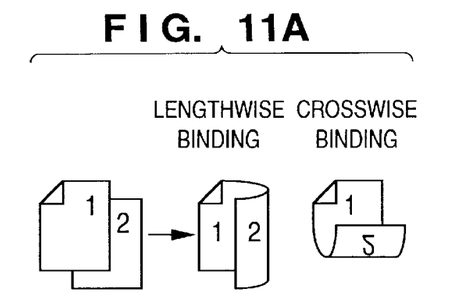
FIGS. 11A to H are diagrams showing examples of undesirable outputs.
Figure 11B:
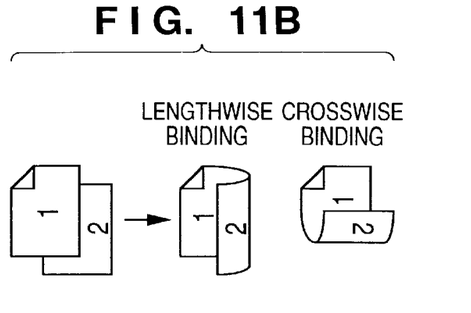
Figure 11C:
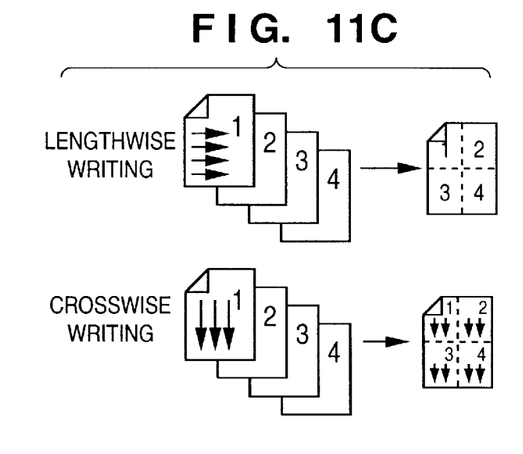
Figure 11D:
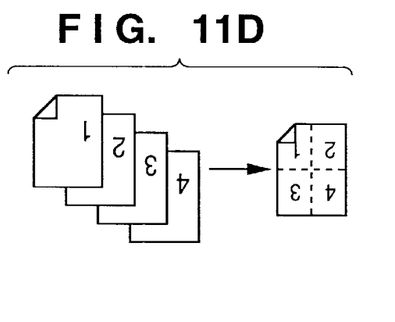
Figure 11E:
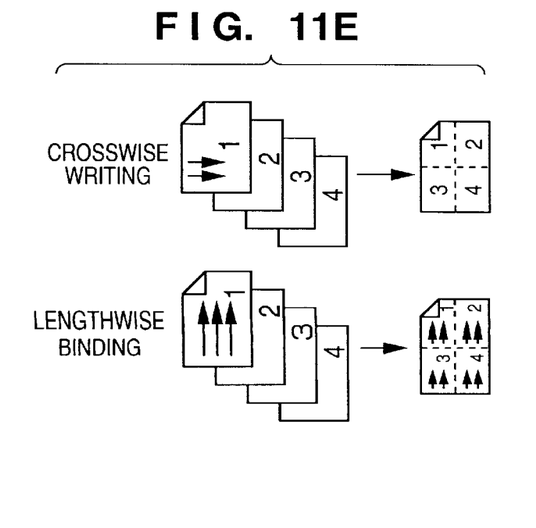
Figure 11F:
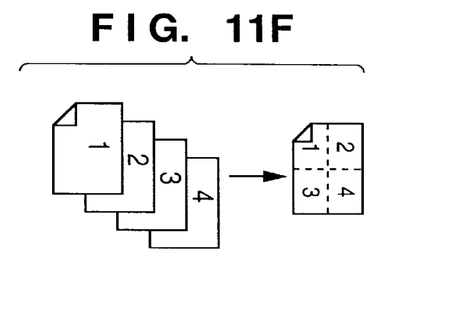

FIGS. 11A and 11B show examples of a double-sided print output. No problems arise when documents are bound at the their left margin (an example of lengthwise binding). However, when documents are bound at the top margin (an example of crosswise binding), the image on the reverse side of a page is upside-down. FIGS. 11C through 11F show examples of a reduced-scale layout output referred to as a "4-in-1" layout. No problems arise in FIG. 11C because the documents bear horizontal writing. However, when documents bear vertical writing, as in the case of a Japanese-language newspaper, for example, the output documents are obtained in an unnatural layout. In a case where documents have been input upside-down, as shown in FIG. 11D, the output obviously is unnatural. In the case of documents bearing vertical writing, as shown in FIG. 11E, the illustrated arrangement is correct. In case of documents bearing horizontal writing, however, this arrangement would result in output documents being obtained in unnatural fashion. The output documents also have an unnatural layout in FIG. 11F, as should be obvious from the illustration.

Figure 11G:
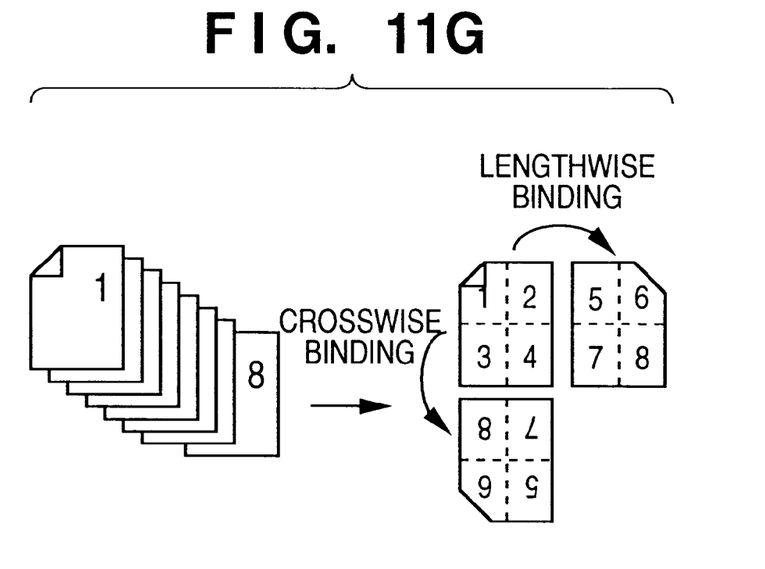
Figure 11H:
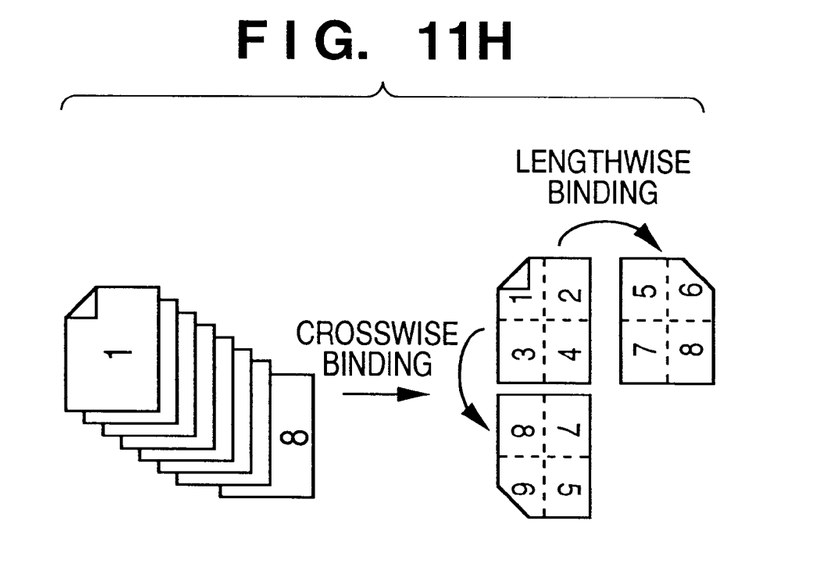

FIGS. 11G through 11H show examples of outputs in a case where 4-in-1 reduced-scale layout outputs are printed on both sides of a page. FIG. 11G shows that no problems arise in case of lengthwise binding but that binding at the top margin will cause the image on the reverse side of a page to appear upside-down. Binding at the top margin shown in FIG. 11H also produces unnatural results.

Thus, in a case where a document bearing a language written horizontally, such as an English-language document, is to be printed, the care given to documents written vertically, as is required in the Japanese language, is not necessary. However, if horizontally written documents are processed in the same way as vertically written documents, the apparatus is likely to make errors in judgment.

SUMMARY OF THE INVENTION

Accordingly, an object of the present invention is to provide an image processing apparatus and method which make it possible to output images in the correct orientation when a double-sided print output and a reduced-scale layout output are produced.

Other objects of the present invention will be apparent from the following description taken in conjunction with the accompanying drawings, in which like reference characters designate the same or similar parts throughout the figures thereof.

DESCRIPTION OF THE PREFERRED EMBODIMENTS

An embodiment of the present invention will now be described in detail with reference to the accompanying drawings.

[Overview of Apparatus]

Figure 1:
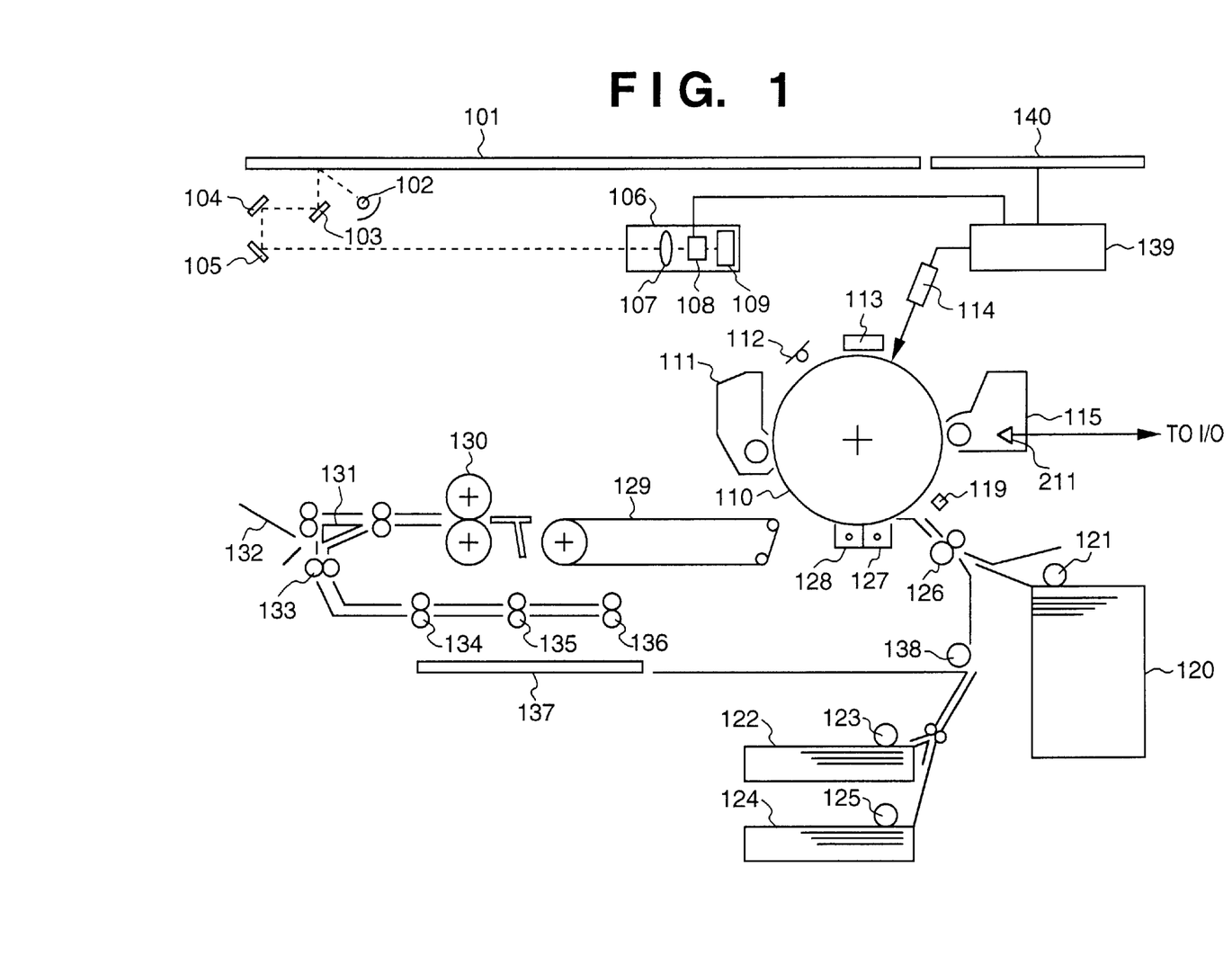
FIG. 1 is a side section showing the structure of an image forming apparatus according to an embodiment of the present invention.

FIG. 1 is a transverse sectional view showing the structure of an image forming apparatus according to an embodiment of the present invention. The apparatus includes a glass platen 101 on which a document is placed at a prescribed position. A document illuminating lamp 102 comprising a halogen lamp exposes to light the document that has been placed on the glass platen 101. Scanning mirrors 103, 104, 105, which are incorporated in an optical scanning unit (not shown), introduce reflected light from the document to a CCD unit 106 while being moved back and forth. The CCD unit 106 comprises an image forming lens 107 for forming an image of the reflected light from the original on a COD (charge-coupled device), an image sensing device 108 constituted by a CCD, and a CCD driver 109 for driving the image sensing device 108. An image signal output from the image sensing device 108 is converted to digital data composed of, say, eight bits, after which the digital data is applied to a controller 139.

A photosensitive drum 110 is de-electrified by a pre-exposure lamp 112 to prepare it for subsequent image formation. A corona discharge device 113 charges the photosensitive drum 110 uniformly. Exposure means 114, which is constituted by a semiconductor laser or the like, forms an electrostatic latent image on the surface of the photosensitive drum 110 by exposing the same to light based upon image data processed by the controller 139, which performs image processing and controls the overall apparatus.

A developing unit 115 is constructed so as to be replaceable, allowing the user of the apparatus to simply set the unit at the prescribed position in the apparatus. The developing unit 115 contains developing agent (toner) of the color black, by way of example. The developing unit 115 is provided with a remaining toner sensor 211 for sensing the amount of toner remaining in the developing unit. The output signal of the sensor 211 is input to an I/O interface 205, described later. A pre-transfer corona discharge unit 119 applies a high voltage before the toner image that has been developed on the photosensitive drum 110 is transferred to recording paper. Paper feed units 120, 122, 124 have corresponding paper feed rollers 121, 123, 125, respectively, which are driven to feed transfer paper into the apparatus. The transfer paper is stopped temporarily at the position of a registration roller 126 and then is fed again upon being synchronized to the timing at which the latent image formed on the photosensitive drum 110 is transferred.

A transfer corona discharge device 127 transfers the toner image developed on the photosensitive drum 110 from the drum to the transfer paper fed to the drum. A separating corona discharge device 128 separates the transfer paper, to which the transfer of the image has been completed, from the photosensitive drum 110. Untransferred toner remaining on the photosensitive drum 110 is recovered by a cleaner 111. A conveyance belt 129 conveys the transfer paper that has undergone the transfer process to a fixing unit 130. Here the toner image is fixed as by the application of heat. The path along which the transfer paper bearing the fixed image is conveyed is controlled by a flapper 131, which direct the paper in the direction of a discharge tray 132 or in the direction of an intermediate tray 137.

Feed rollers 133–136 feed the transfer paper, which has undergone the fixing process one time, to the intermediate tray 137 after turning the paper over (for multiple printing on the same side) or not turning the paper over (for double-sided printing). A re-feed roller 138 conveys transfer paper, which has been placed in the intermediate tray 137, to the position of the registration roller 126 again. The controller 139 is equipped with a microcomputer and image processor, described later, and performs the above-described image forming operation in accordance with commands from a control panel 140.

[Controller]

Figure 2:
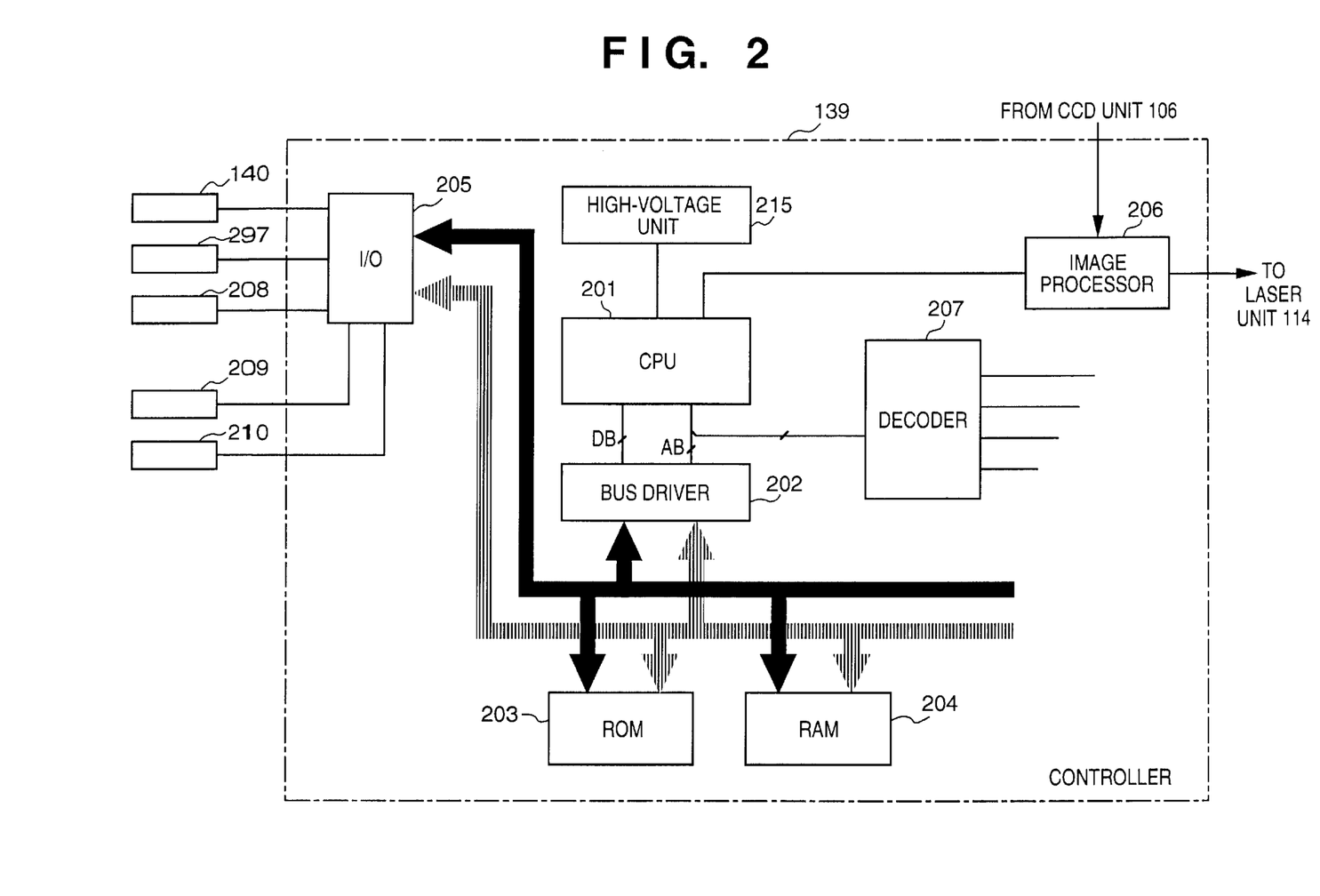
FIG. 2 is a block diagram showing the construction of a controller in the image forming apparatus according to this embodiment.

FIG. 2 is a block diagram showing the construction of the controller 139 in the image forming apparatus according to this embodiment. As shown in FIG. 2, the controller 139 includes a CPU (central processing unit) 201 for overall control of the image forming apparatus. The CPU 201 reads the control procedure (control program) of the apparatus out of a read-only memory (ROM) 203, in which the program has been stored, and executes the program in successive fashion. The CPU 201 has an address bus AB and a data bus DB connected to respective loads via a bus driver circuit 202 and an address decoder 207. A random-access memory (RAM) 204 is a main memory device used for storing input data and employed as a working storage area.

An I/O interface 205 is connected to the loads of the apparatus, such as the control panel 140, which the operator uses to make inputs from keys and which has a liquid crystal display and LEDs, etc., for displaying such information as the status of the apparatus, various motors 297, clutches 208 and solenoids 209 for driving the paper feed system, conveyance system and optics unit, and various paper sensors 210 for sensing the conveyed paper. A high-voltage unit 215 outputs high voltage to the above-mentioned corona discharge device 113, developing unit 115, pre-transfer corona discharge device 119, transfer corona discharge device 127 and separating corona discharge device 128 in accordance with commands from the CPU. The output of the CCD unit 106 enters an image processor 206, which subjects the signal to image processing and then outputs a control signal to the laser unit 114 to control the laser in accordance with the image data obtained. As a result, a laser beam emitted by the laser unit 114 irradiates the photosensitive drum 110 shown in FIG. 1.

[Image Processor]

Figure 3:
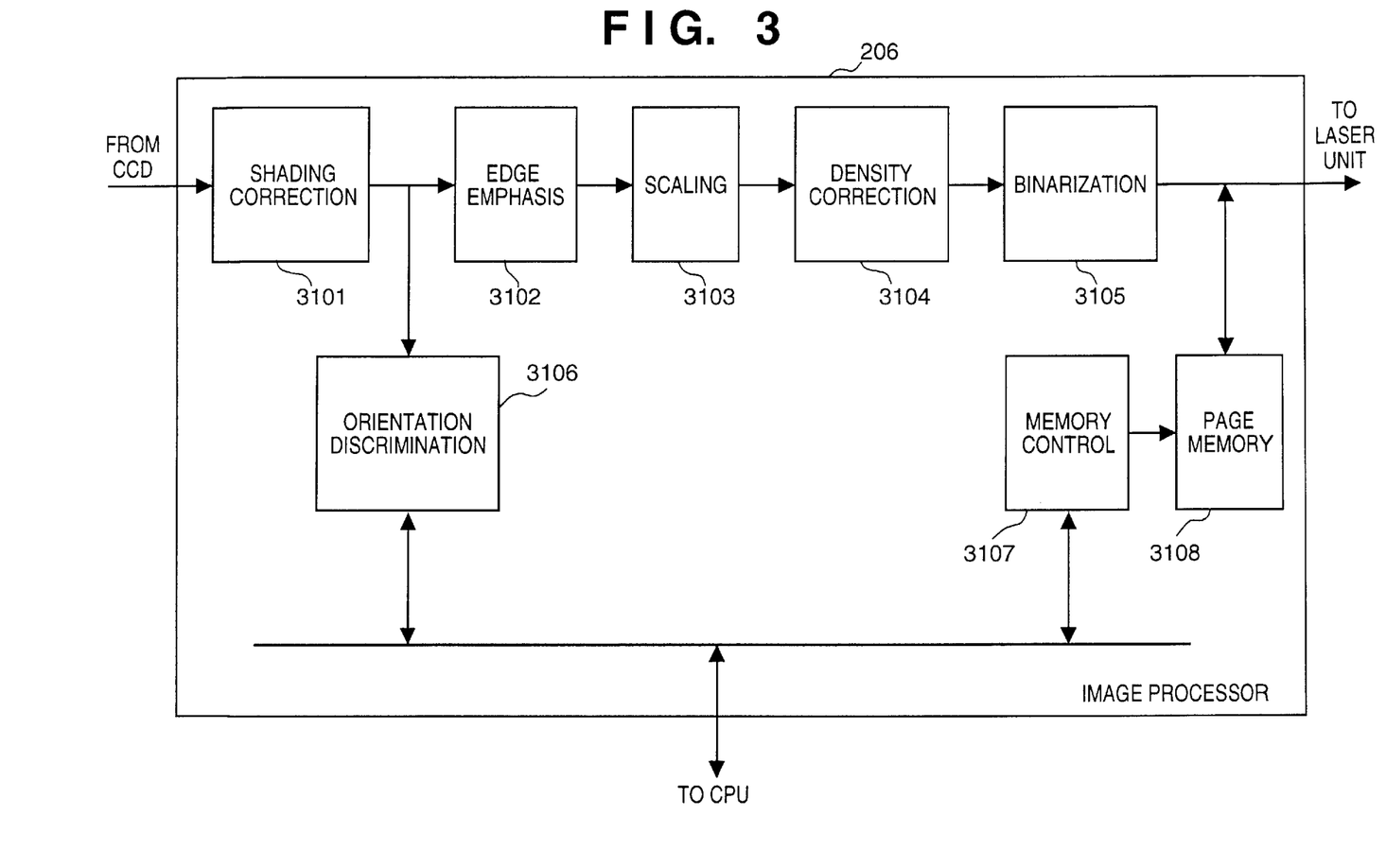
FIG. 3 is a block diagram showing the construction of an image processor within the controller of the image forming apparatus according to this embodiment.

FIG. 3 is a block diagram showing the construction of the image processor 206 within the controller 139 of the image forming apparatus according to this embodiment. The image processor shown in FIG. 3 is so adapted that the image signal converted to an electric signal from the CCD 108 is first subjected to a shading correction by a shading correction circuit 3101 to correct for variance between pixels, after which the corrected signal is subjected to quadratic differentiation in an edge emphasizing circuit 3102 using, say, a 5×5 window to emphasize the edges of the image.

The controller 139 further includes a scaling circuit 3103 which executes data downsampling processing when making a copy of reduced size and data interpolation when an making an enlarged copy, a density correction circuit 3104 for effecting conversion to the desired density, and a binarization circuit 3105 for binarizing the corrected signal. Methods of binarization include simple binarization, the screen method, the error diffusion method or some other method.

The image signal thus binarized is sent to the laser unit 114 or stored in a page memory 3108. To perform control such as that for producing the reduced-scale layout mentioned above, the image signal is stored in the page memory 3108 temporarily, after which editing is performed in the memory followed by delivery of the edited data to the laser unit 114. The editing operation in memory is carried out by a memory control circuit 3107.

An orientation discriminating unit 3106 serves as means for sensing orientation of a document. Specifically, the orientation discriminating unit 3106 discriminates the orientation of the document placed on the platen (i.e. whether the document is oriented vertically or horizontally) and the typesetting direction (vertical or horizontal writing). The CPU 201 delivers the information that has been entered from the control panel, namely Japanese or English, to the orientation discriminating unit 3106, where the information receives the results of processing executed by the orientation discriminating unit. The CPU 201 applies a command to the memory control circuit 3107 based upon information accepted from the orientation discriminating unit 3106 and information entered from the control panel. The memory control circuit 3107 edits the image in the page memory 3108 based upon the command from the CPU 201.

[Control Panel]

Figure 4:
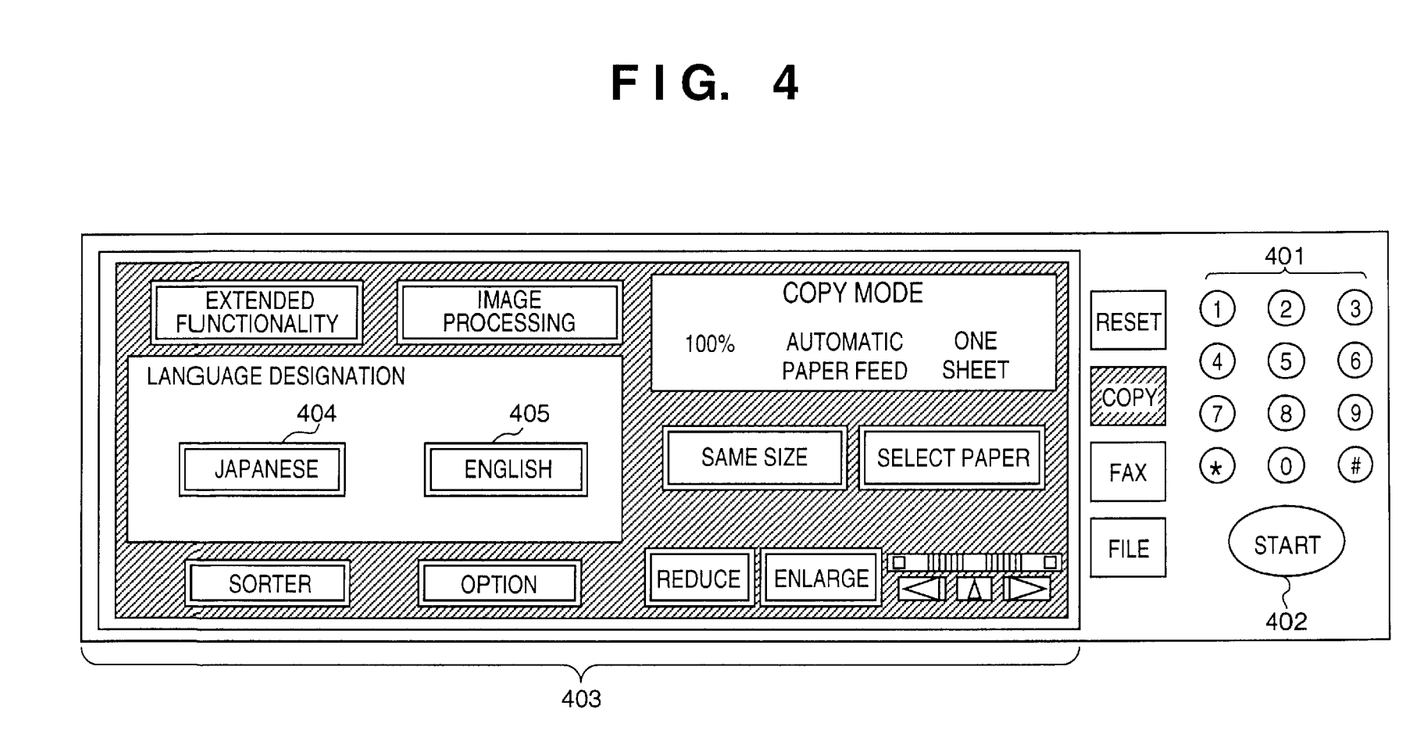
FIG. 4 is a diagram showing an example of the front face of a control panel according to this embodiment.
Figure 5:
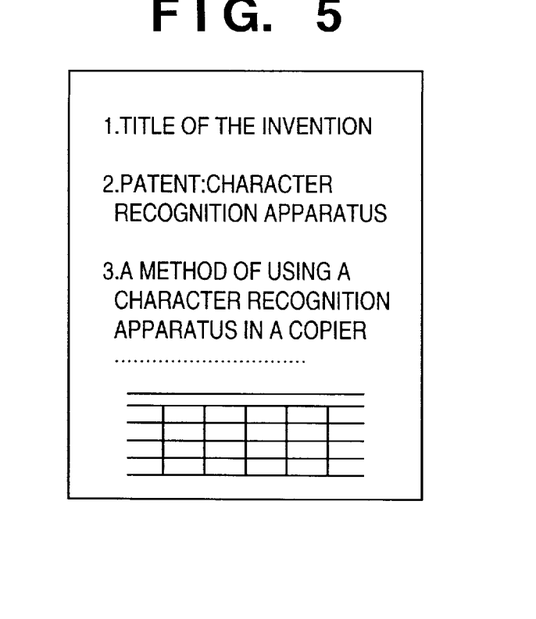
FIG. 5 is a diagram showing an input image.

FIG. 4 is a diagram showing an example of the front face of the control panel of the image forming apparatus according to this embodiment. The control panel includes a numeric key pad 401 for setting number of copies and other necessary numerical values, a copy start key 402 for commanding the start of copying, and a large liquid crystal touch-sensitive panel 403 for displaying keys on liquid crystal. The operator is capable of designating a desired operation by pressing a displayed key with his or her finger.

Keys 404, 405 are for designating the language of the input document. The key 404 is for designating a language such as Japanese in which writing is possible in both vertical and horizontal directions. The key 405 is for designating a language such as English in which writing is in the horizontal direction. Though keys other than those mentioned above also are present on the liquid crystal touch-sensitive panel 403, these do not have a direct bearing upon the present invention and need not be described.

[Operation of Orientation Discriminating Unit]

The orientation discriminating unit 3106 receives the image data from the CCD and extracts character areas from this data. Rectangular character areas discriminated in the input image are shown in FIGS. 5 through 8, which are useful in describing an example of a method extracting these character areas. A method based upon histogram analysis is used as a method of extracting a character area 603, as illustrated at 601, 602 in FIG. 6.

Figure 6:
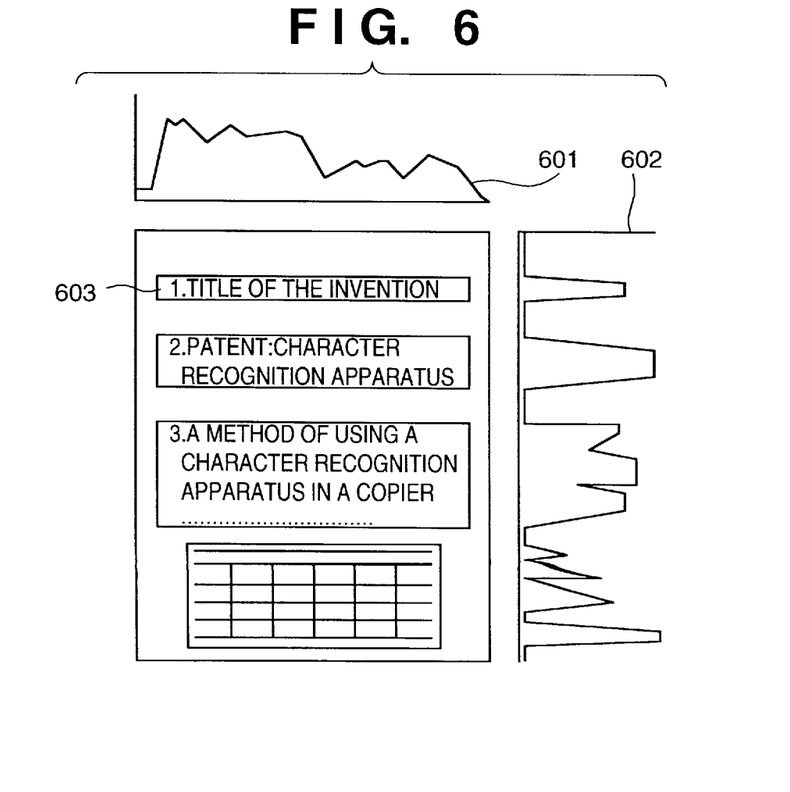
FIG. 6 is a diagram showing the manner in which a line is extracted from an area judged to be a character area.
Figure 7:
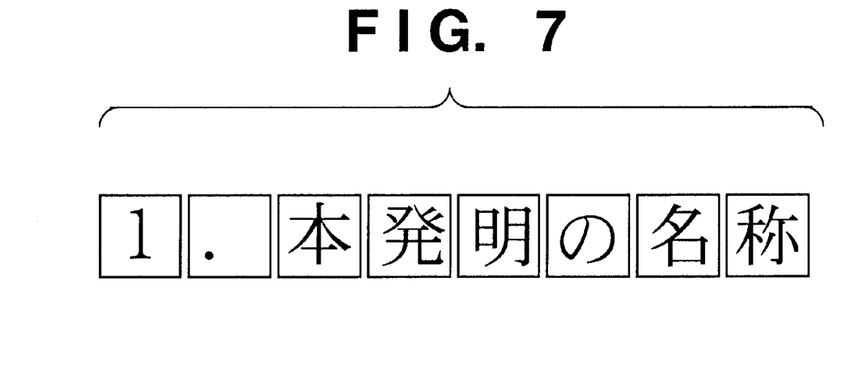
FIG. 7 is a diagram showing the manner in which characters are extracted from an extracted line.
Figure 8:
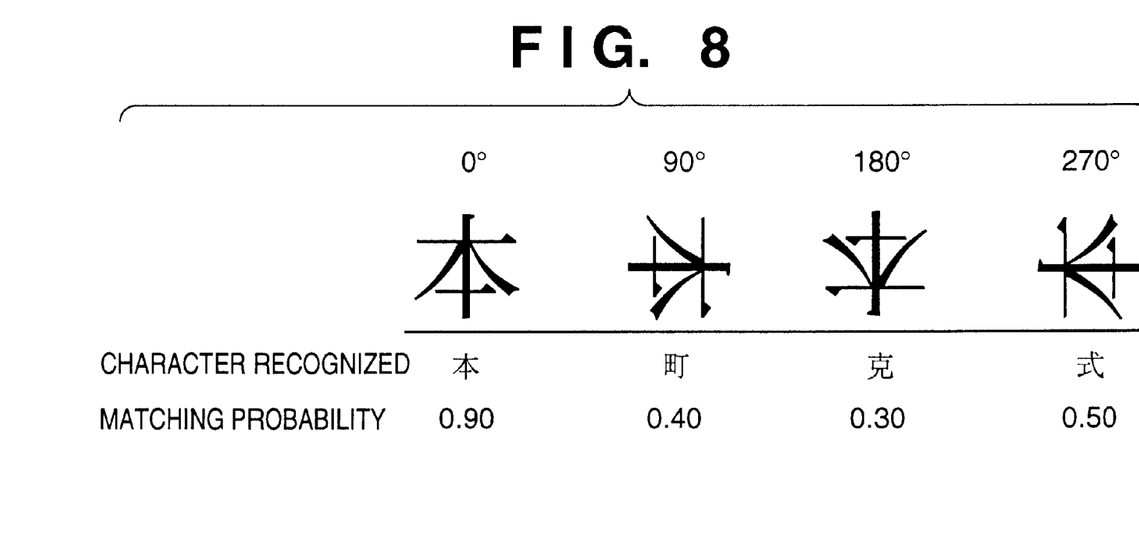
FIG. 8 is a diagram showing the manner in which 0-, 90-, 180- and 270-degree matching is performed with regard to an extracted character.

First, a line is extracted from an area judged to be the character area 603, as shown in FIG. 6. The extraction is made from the input image illustrated in FIG. 5. Characters are then extracted (FIG. 7) from the extracted line. Next, as shown in FIG. 8, the extracted character is subjected to 0-, 90-, 180- and 270-degree matching. The character orientation that gives the highest matching probability is adopted as the orientation of the document. In addition, information indicative of vertical/horizontal writing is obtained from the orientation of the line and the orientation of the characters. This information and the orientation of the document is sent back to the CPU 201.

Figure 9:
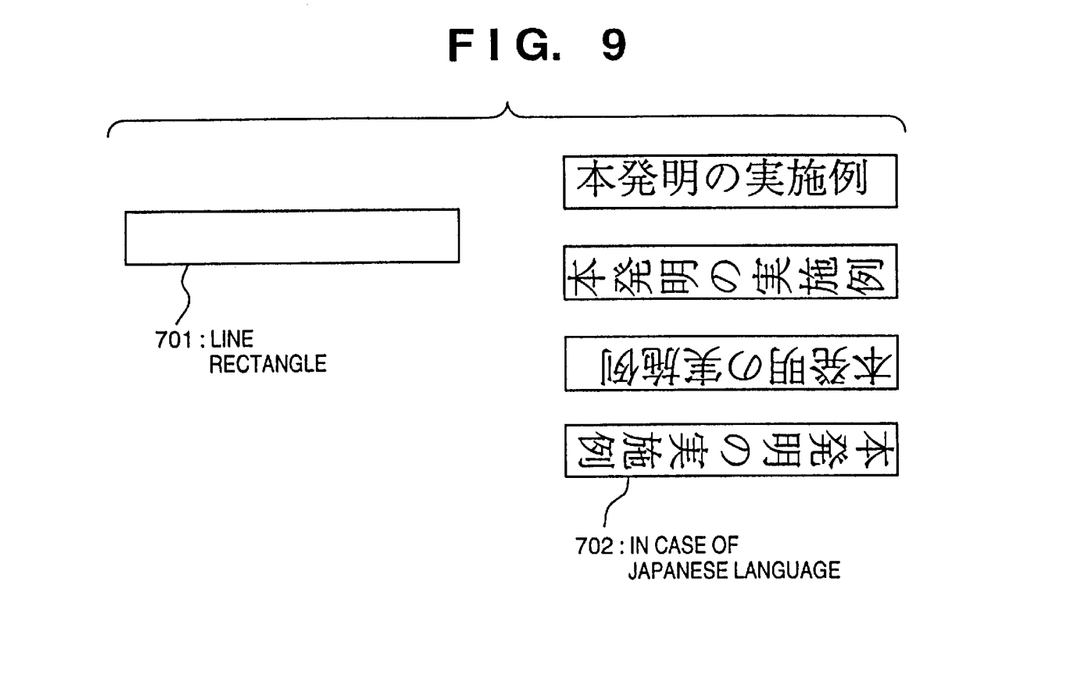
FIG. 9 is a diagram showing matching for four orientations.
Figure 10:
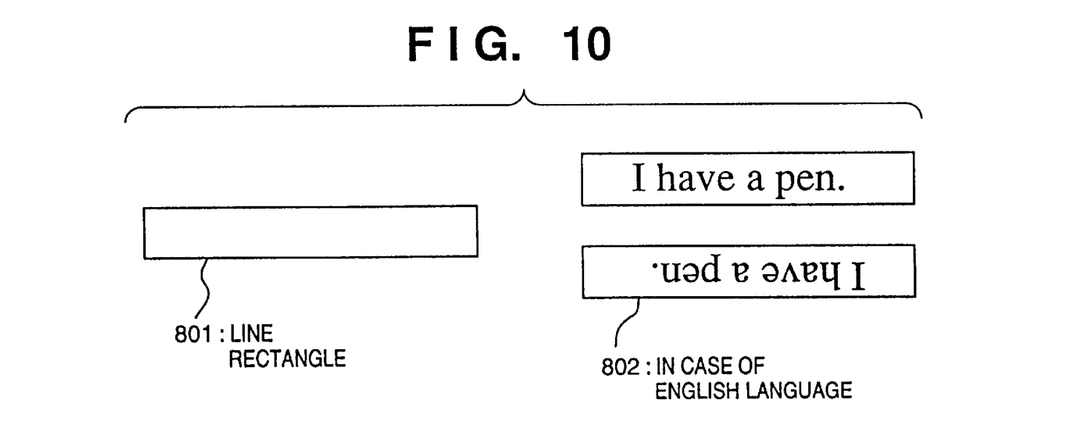
FIG. 10 is a diagram showing matching for two orientations.

In case of a language such as Japanese in which writing in both the vertical and horizontal direction is possible, as shown in FIG. 9, four-orientation matching (indicated at 702 in FIG. 9) must be carried out. However, in case of a language such as English in which writing is performed in the horizontal direction, as shown in FIG. 10, possible orientations are limited to two (indicated at 802 in FIG. 10) and it will suffice to perform 0- and 180-degree matching or 90- and 270-degree matching, depending upon the orientation of the line.

Thus, orientation discriminating unit 3106 switches between four-orientation and two-orientation matching processing in accordance with the language specifying parameter which it received from the control panel of the apparatus.

Processing for a double-sided print output and reduced-scale layout output according to this embodiment will now be described. FIGS. 12A through 12H are diagrams showing examples of double-sided printing and reduced-scale layout outputs according to this embodiment.

Figure 12A:
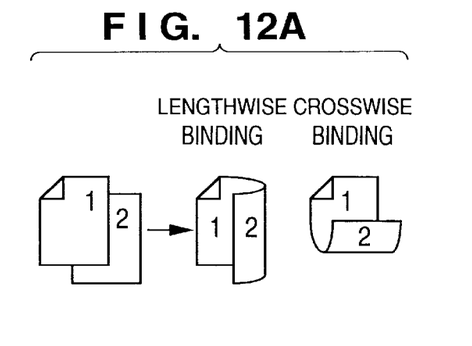
FIGS. 12A to H are diagrams showing examples of double-sided printing and reduced-scale layout outputs according to an embodiment of the present invention.
Figure 12B:
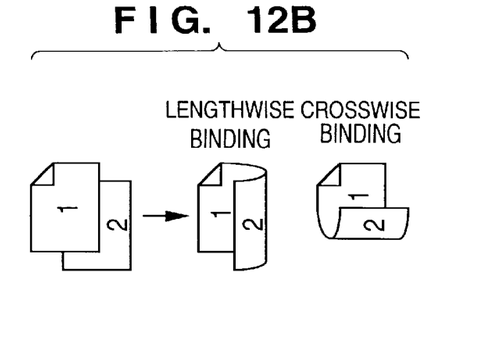
Figure 12C:
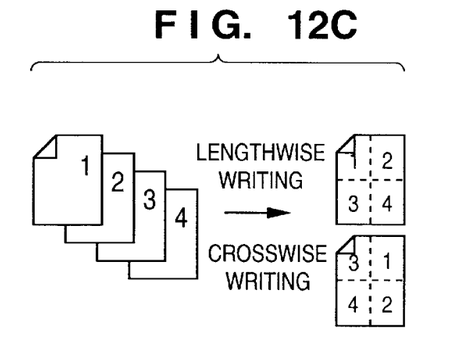
Figure 12D:
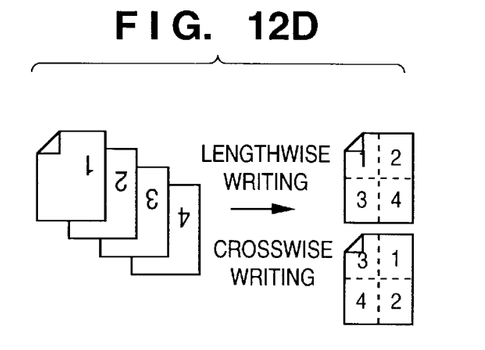
Figure 12E:
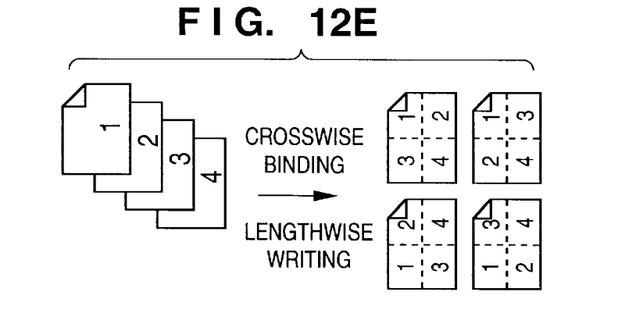
Figure 12F:
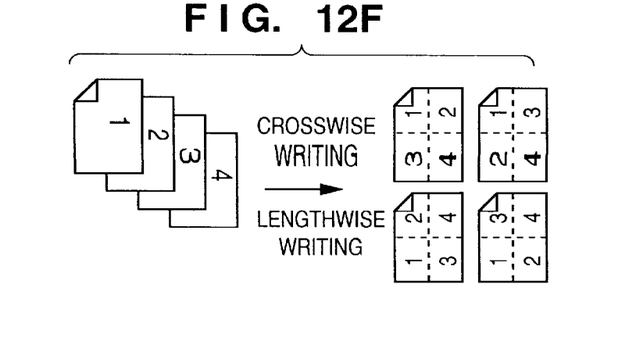

A double-sided print output will be described first. FIGS. 12A and 12B are examples of double-sided print outputs. Ordinary processing will suffice in case of a lengthwise binding. For a crosswise binding, however, the output image is produced upon first being rotated 180 degrees by the image processor 206 when the image on the reverse side is processed.

Figure 13:
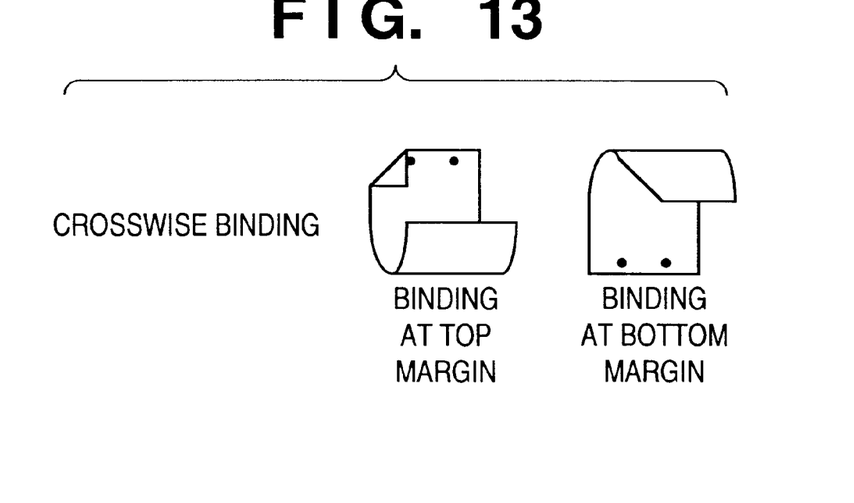
FIG. 13 is a diagram for describing binding at the top margin and binding at the bottom margin, which are examples of crosswise binding.
Figure 14:
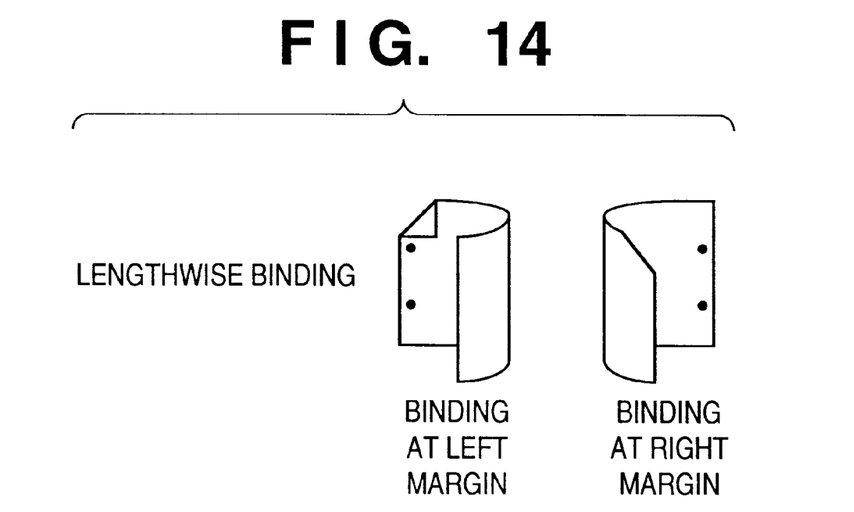
FIG. 14 is a diagram for describing binding at the left margin and binding at the right margin, which are examples of lengthwise binding.

It should be noted that crosswise binding includes binding at the top margin and binding at the bottom margin, as shown in FIG. 13, and that lengthwise binding includes binding at the left margin and binding at the right margin, as shown in FIG. 14. The orientation of the output document need only be rotated to the normal orientation in dependence upon the indication from the control panel 140 (i.e. whether the language is Japanese or English).

Reduced-scale layout will be described next. FIGS. 12A through 12F are examples of reduced-scale layout outputs. In this case the orientation discriminating unit 3106 discriminates the orientation of the document based upon the indication (i.e. whether the language is Japanese or English) from the control panel 140, and the image processor 206 controls rotation and output position in such a manner that the output document will be output normally.

Figure 12G:
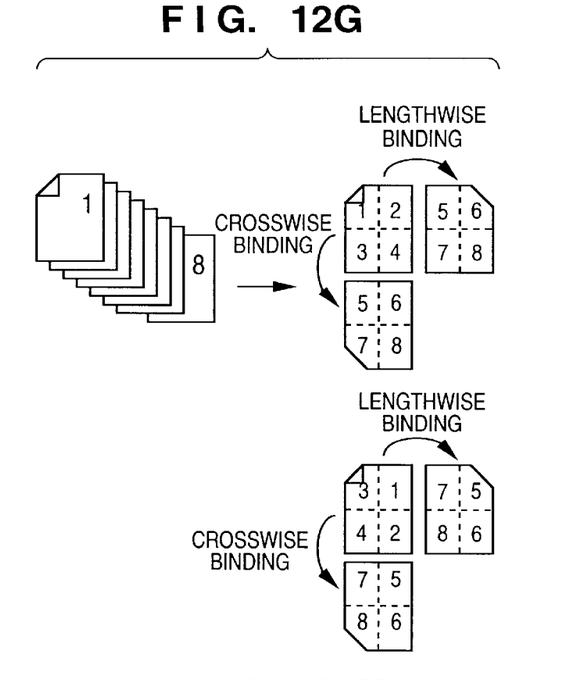
Figure 12H:
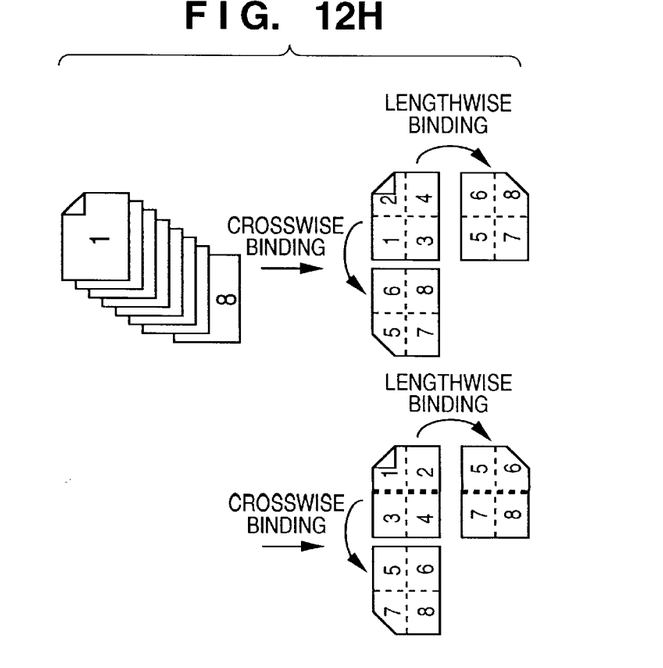

In a case where a reduced-scale layout output and a double-sided print output are combined, processing can be executed in a manner similar to that described above to output an image having the correct orientation as shown in FIGS. 12G and 12H.

In accordance with this embodiment, as described above, it is so arranged that the user can specify, via a control panel, whether an input document is in a language which can be written horizontally only or in language which may be written vertically as well. This makes it possible to reduce the possibility that a problem will be caused by erroneous detection of orientation in case of a language such as English in which writing is horizontal. A correctly oriented image can be obtained when a doubled-sided print output and reduced-scale layout output are produced.

In a case where the apparatus is shipped to an area where the language normally spoken is written horizontally, as in the case of English or French, the user need not execute processing for dealing with Japanese, for example. In such a situation the CPU 201 would be set to always notify the orientation discriminating unit 3106 that the document placed on the platen is in a language written horizontally. An alternative approach if the apparatus is shipped to the area mentioned above would be to so adapt the apparatus that the orientation discriminating unit 3106 always treats a document as if it were one in a language written horizontally without requiring a signal from another controller. In such cases it would suffice to set a DIP switch, for example, at the time of shipping.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiment, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiment.

Thus, in accordance with this embodiment, as described above, the orientation of a document is detected by discriminating a character area in an input image on the basis of an image signal obtained from the document, and a specified double-sided print output or reduced-scale layout output can be produced based upon the results of detection. This makes it possible to output an image having the correct orientation when a double-sided print output or reduced-scale layout output is produced.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting an image including a character string;
   designating means for designating a language of the character string included in the image;
   character recognition means for performing character recognition of the character string included in the image, said character recognition means performing the character recognition in view of a plurality of directions;
   discriminating means for discriminating orientation of the image in accordance with results of the character recognition in the plurality of directions performed by said character recognition means; and
   image processing means for processing the image in accordance with a result of discrimination by said discriminating means,
   wherein said character recognition means performs the character recognition in four directions in a case where a first language is designated, and performs the character recognition in two directions in a case where a second language is designated.

2. The apparatus according to claim 1, wherein the first language is Japanese and the second language is English.

3. The apparatus according to claim 1, further comprising sensing means for sensing orientation of the character string in the input image, wherein said character recognition means performs the character recognition in a direction in which the character string sensed by said sensing means is recognized in the horizontal direction in a case where the second language is designated.

4. The apparatus according to claim 3, wherein said sensing means senses orientation of the character string based upon histogram of the image regarding the horizontal and vertical directions.

5. The apparatus according to claim 1, wherein said character recognition means outputs degree of the matching with recognized characters in each direction, and said discrimination means discriminates orientation of the image based upon the degree of the matching outputted from said character recognition means.

6. The apparatus according to claim 1, wherein said image processing means performs rotation of the image.

7. The apparatus according to claim 1, wherein said image processing means performs layout in which a plurality of images are laid as an image.

8. An image processing apparatus comprising:
   input means for inputting an image including a character string;
   designating means for designating a language of the character string included in the image;
   discriminating means for discriminating orientation of the image based upon the character included in the image; and
   image processing means for processing the image in accordance with a result of discrimination by said discriminating means,
   wherein said discriminating means discriminates the orientation as a premise that the character string in the image is writing in either horizontal direction or vertical direction in a case where a first language is designated by said designating means, and discriminates the orientation as a premise that the character string in the image is writing in the horizontal direction in a case where a second language is designated by said designating means.

9. The apparatus according to claim 8, wherein the first language is Japanese and the second language is English.

10. The apparatus according to claim 8, wherein said image processing means performs rotation of the image.

11. The apparatus according to claim 8, wherein said image processing means performs layout in which a plurality of images are laid as an image.

12. An image processing method comprising the steps of:
    inputting an image including a character string;
    designating a language of the character string included in the image;
    performing character recognition of the character string included in the image, the character recognition being performed in views of a plurality of directions;
    discriminating orientation of the image in accordance with results of the character recognition in the plurality of directions; and
    processing the image in accordance with a result of discrimination,
    wherein the character recognition is performed in four directions in a case where a first language is designated, and is performed the character recognition in two directions in a case where a second language is designated.

13. The method according to claim 12, wherein the first language is Japanese and the second language is English.

14. The method according to claim 12, further comprising the step of sensing orientation of the character string in the input image, wherein the character recognition is performed in a direction in which the character string is sensed in the horizontal direction in a case where the second language is designated.

15. The method according to claim 14, wherein said sensing step senses orientation of the character string based upon histogram of the image regarding the horizontal and vertical directions.

16. The method according to claim 12, wherein in the character recognition, degree of the matching with recognized characters in each direction is outputted, and orientation of the image is discriminated based upon the degree of the matching outputted from said character recognition means.

17. The method according to claim 12, wherein said processing step performs rotation of the image.

18. The method according to claim 12, wherein said processing step performs layout in which a plurality of images are laid as an image.

19. An image processing method comprising the steps of:

inputting an image including a character string;

designating a language of the character string included in the image;

discriminating orientation of the image based upon the character included in the image; and processing the image in accordance with a result of discrimination, wherein said discriminating step discriminates the orientation as a premise that the character string in the image is writing in either horizontal direction or vertical direction in a case where a first language is designated, and discriminates the orientation as a premise that the character string in the image is writing in the horizontal direction in a case where a second language is designated.

20. The method according to claim 19, wherein the first language is Japanese and the second language is English.

21. The method according to claim 19, wherein said processing step performs rotation of the image.

22. The apparatus according to claim 19, wherein said processing step performs layout in which a plurality of images are laid as an image.

23. A computer readable storage medium storing program codes of image processing method, comprising:

a code of a step inputting an image including a character string;

a code of a step designating a language of the character string included in the image;

a code of a step performing character recognition of the character string included in the image, the character recognition being performed in view of a plurality of directions;

a code of a step discriminating orientation of the image in accordance with results of the character recognition in the plurality of directions; and a code of a step processing the image in accordance with a result of discrimination, wherein the character recognition is performed in four directions in a case where a first language is designated, and is performed the character recognition in two directions in a case where a second language is designated.

24. A computer readable storage medium storing program codes of image processing method, comprising:

a code of a step inputting an image including a character string;

a code of a step designating a language of the character string included in the image;

a code of a step discriminating orientation of the image based upon the character included in the image; and a code of a step processing the image in accordance with a result of discrimination, wherein said discriminating step discriminates the orientation as a premise that the character string in the image is writing in either horizontal direction or vertical direction in a case where a first language is designated, and discriminates the orientation as a premise that the character string in the image is writing in the horizontal direction in a case where a second language is designated.

\* \* \* \* \*

UNITED STATES PATENT AND TRADEMARK OFFICE
CERTIFICATE OF CORRECTION

PATENT NO. : 5,960,229

DATED : September 28, 1999

INVENTOR(S): SHIGEO FUKUOKA, et al.

It is certified that error appears in the above-identified patent and that said Letters Patent is hereby corrected as shown below:

COLUMN 2:

Line 27, "H" should read --11H--.
Line 29, "H" should read --12H--.
Line 57, "COD" should read --CCD--.

COLUMN 3:

Line 36, "direct" should read --directs--.

COLUMN 4:

Line 30, "an" should be deleted.

COLUMN 5:

Line 36, "direction" should read --directions--.

UNITED STATES PATENT AND TRADEMARK OFFICE
CERTIFICATE OF CORRECTION

PATENT NO. : 5,960,229

DATED : September 28, 1999

INVENTOR(S) : SHIGEO FUKUOKA, et al.

It is certified that error appears in the above-identified patent and that said Letters Patent is hereby corrected as shown below:

COLUMN 6:

Line 19, "language" should read --a language--.

COLUMN 8:

Line 47, "is performed the character recognition" should read --the character recognition is performed--.

COLUMN 10:

Line 12, "is performed the character recognition" should read --the character recognition is performed--.

Signed and Sealed this

Twenty-seventh Day of June, 2000

Attest:

Q. TODD DICKINSON

*Attesting Officer*     *Director of Patents and Trademarks*